United States Patent [19]

Wolstein et al.

[11] 4,152,397

[45] May 1, 1979

[54] METHOD FOR THE CONVERSION OF PHOSPHATE ROCK CONTAINING MAGNESIUM INTO PHOSPHORIC ACID AND A MIXTURE OF MAGNESIUM AND CALCIUM CARBONATES

[75] Inventors: Friedrich Wolstein, Essen; Wilhelm Wengeler, Bochum-Stiepel; Ferdinand Holtmeier, Unna, all of Fed. Rep. of Germany

[73] Assignee: UHDE GmbH, Dortmund, Fed. Rep. of Germany

[21] Appl. No.: 911,928

[22] Filed: Jun. 2, 1978

[30] Foreign Application Priority Data

Mar. 17, 1978 [DE] Fed. Rep. of Germany ....... 2813358

[51] Int. Cl.² .............................................. C01F 11/18
[52] U.S. Cl. .................................... 423/161; 423/165; 423/167; 423/319
[58] Field of Search ................ 423/319, 167, 165, 161

[56] References Cited

U.S. PATENT DOCUMENTS

| | | | |
|---|---|---|---|
| 1,816,285 | 7/1931 | Johnson | 423/319 |
| 3,382,035 | 5/1968 | Slater | 423/319 |
| 3,493,340 | 2/1970 | Bosen et al. | 423/167 |
| 3,518,071 | 6/1970 | Villiers-Fisher et al. | 423/319 |

Primary Examiner—O. R. Vertiz
Assistant Examiner—Wayne A. Langel
Attorney, Agent, or Firm—Malcolm W. Fraser

[57] ABSTRACT

Magnesium-bearing phosphate rock in small grain size is converted into phosphoric acid so that no by-products, which are difficult to dispose of are produced. The crushed rock is mixed with water and subsequently acidified with nitric acid, the reaction product being filtered and washed before the neutralization point is reached. The wet and filtered rock is treated with nitric acid to form phosphoric acid and a slurry of calcium nitrate tetrahydrate. The previously formed filtrate is mixed with the calcium nitrate tetrahydrate slurry and this mixture is reacted with ammonia and carbonic acid to form ammonium nitrate, magnesium carbonate and calcium carbonate, which are then separated into an ammonium nitrate solution and a mixture of magnesium and calcium carbonates.

1 Claim, 1 Drawing Figure

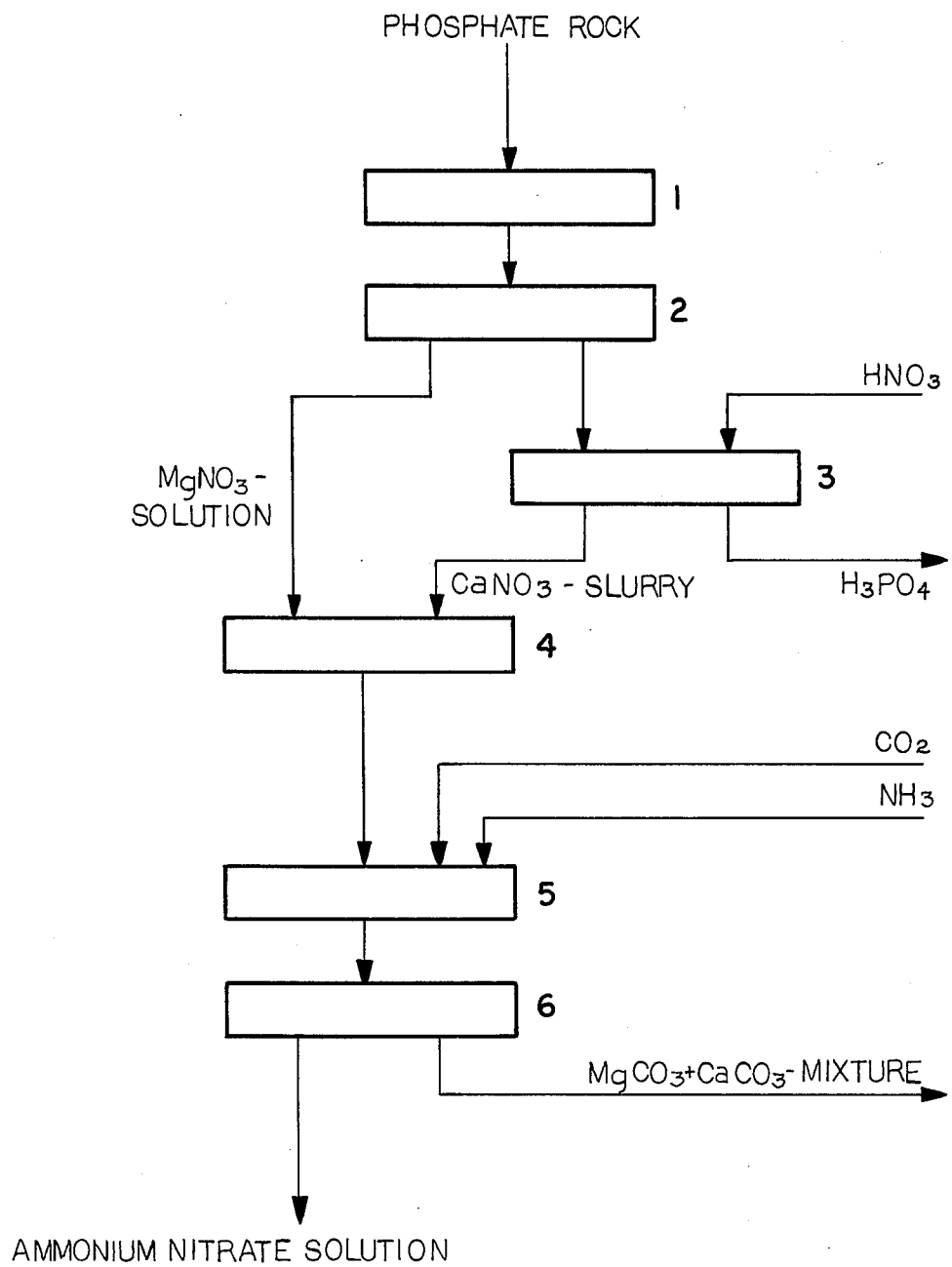

METHOD FOR THE CONVERSION OF PHOSPHATE ROCK CONTAINING MAGNESIUM INTO PHOSPHORIC ACID AND A MIXTURE OF MAGNESIUM AND CALCIUM CARBONATES

BACKGROUND OF THE INVENTION

The invention relates to a process for the conversion of magnesium-bearing phosphate rock into phosphoric acid and a mixture of magnesium and calcium carbonates. Phosphate rock is mined as mineral rock containing a great variety of admixtures and is used as feedstock for the production of a magnitude of fertilizers.

Since phosphate rock is found in nature in different compositions it is necessary either to remove the admixtures and/or impurities from the process without disrupting the process or to convert them into usable products.

A method is known for processing magnesium-bearing phosphate rock with a content magnesium or magnesium compounds that is lower than 0.3% Mg or 0.5% MgO. This degree or contamination is sufficiently low to avoid any process disruptions. A German patent specification No. OS 25 31 519 describes a process in which phosphate rock with a magnesium content in excess of 0.3% is treated. The method described in German patent specification No. OS 25 31 519 enables the MgO content to be reduced for instance from 1.8% to a value of less than 0.5% by dissolving the magnesium compounds with the aid of sulphuric acid, thus obtaining phosphate rock that is largely free of magnesium and a filtrate containing dissolved magnesium sulphate. Said OS patent makes no mention of the use or disposal of the filtrate.

SUMMARY OF THE INVENTION

The purpose of this invention is to convert magnesium phosphate rock into phosphoric acid such that no by-products which are difficult to dispose of are produced while keeping the process relatively simple.

According to the present invention this task is accomplished by combining several process steps in the following way:

(a) the crushed, screened phosphate rock with a grain size of 0.5 mm is mixed with water in a ratio of 1 : 5 by weight, subsequently acidified with nitric acid to obtain pH of 2.0-4.0, the reaction product being filtered and washed before the neutralization point is reached;

(b) the wet, filtered phosphate rock is treated by a known method with nitric acid to form phosphoric acid and a slurry of calcium nitrate tetrahydrate;

(c) the filtrate obtained in process step (a) and containing mainly magnesium nitrate is mixed with the calcium nitrate tetrahydrate slurry from process step (b);

(d) the mixture derived from process step (c) reacts with ammonia and carbonic acid to form ammonium nitrate, magnesium carbonate and calcium carbonate;

(e) the reaction product obtained in process step (d) is separated by a known method into an ammonium nitrate solution and a mixture of magnesium and calcium carbonates. According to another embodiment of the invention, a change of the crystallisation temperature of the product ammonium nitrate is obtained by admixing part of the magnesium nitrate solution obtained in process step (a).

The particular advantages of the process according to the invention are that the filtrate containing magnesium nitrate detained in the phosphate rock treatment is processed to form a mixture of magnesium and calcium carbonate and that, upon reaction with $NH_3$ and $CO_2$, the nitrate component of the magnesium nitrate filtrate yields ammonium nitrate. Subject process combination, according to the impurities contained in the phosphate rock, such as magnesium and its compounds, are converted into usable products without causing any environmental pollution. The mixture of magnesium and calcium carbonates obtained thereby is pure and can be used in other fertilizer production processes or for the manufacture of cement.

It was further found that the magnesium nitrate solution obtained in the filtration step of the phosphate rock treatment can be mixed with the calcium nitrate tetrahydrate obtained in solid form when digesting the phosphate rock with nitric acid, before this mixture reacts with $NH_3$ and $CO_2$ to form an ammonium nitrate solution, and that the magnesium is then precipitated in the form of magnesium carbonate.

BRIEF DESCRIPTION OF THE DRAWING

The FIGURE is a diagrammatic view showing the steps of the process.

DESCRIPTION OF THE PREFERRED EMBODIMENT

Phosphate rock with a grain size of 0–4 mm and a $P_2O_5$ content of 25.8% is ground according to the process described in German specification No. OS 25 31 519 and screened to a fine grain of 30 $\mu$–0,5 mm. The screened phosphate rock is then acidified with nitric acid such that a pH value of 2.5 is obtained. After a reaction time of about 30 min. in the step 1, the Mg (No3) solution is separated in filtering station 2 from the treated phosphate rock which now has a MgO content of less than 0.3%.

The filter cake, i.e. treated phosphate rock, is processed with $HNO_3$ by a known method in digester 3, thus obtaining upon cooling and separation product phosphoric acid and product calcium nitrate tetrahydrate slurry in two separate streams. The phosphoric acid incl. a minor excess of nitric acid constitute the final product of the combined process and can be further processed as required.

According to the invention, the calcium nitrate tetrahydrate slurry is mixed in mixer 4 with the magnesium nitrate solution from filtering station 2. From mixer 4 the solution is sent to the ammonium nitrate unit 5 where a reaction with $CO_2$ and $NH_3$ takes place to form the ammonium nitrate solution and the solid calcium carbonate and magnesium carbonate. Since the calcium carbonate and magnesium carbonate precipitate fully and are separated from the ammonium nitrate solution in step 6 by known techniques such as filters or centrifuges, the product therefrom is a technically pure ammonium nitrate solution.

The ammonium nitrate produced by the process according to the invention is particularly suitable for the production of NPK fertilizers. The ammonium nitrate is added to the neutralized slurry obtained in the neutralization of phosphoric acid with ammonia upstream of the granulation or prilling section of the NPK plant. This method yields a fertilizer that is rich is nitrogen. The addition of ammonium nitrate is possible only on condition that the ammonium nitrate added is technically free of magnesium compounds.

What we claim is:

1. Process for converting magnesium-bearing phosphate rock to phosphoric acid and a mixture of magnesium and calcium carbonates consisting of
   a. crushing and screening phosphate rock to a grain size of less than 0.5 mm,
   b. mixing the rock from step a with water in a ratio of 1 : 5 by weight,
   c. acidifying the resultant mixture with nitric acid to a pH value of the order of 2.5 to obtain magnesium nitrate
   d. filtering and washing the reaction product from step c before the neutralization point is reached to provide a filtrate containing magnesium nitrate,
   e. digesting the wet, filtered phosphate rock with nitric acid to form phosphoric acid and a calcium nitrate tetrahydrate slurry,
   f. mixing the filtrate from step d with calcium nitrate tetrahydrate slurry from step e,
   g. reacting the mixture from step f with ammonia and carbonic acid to form ammonium nitrate, magnesium carbonate and calcium carbonate, and
   h. separating the reaction product from step g into an ammonium nitrate solution and a mixture of magnesium and calcium carbonates.